United States Patent
Warnecke et al.

(10) Patent No.: US 7,051,694 B2
(45) Date of Patent: May 30, 2006

(54) SEALING SYSTEM FOR A SHAFT

(75) Inventors: Frank Warnecke, Karlsruhe (DE); John Kapcoe, Carleton, MI (US)

(73) Assignee: Federal-Mogul Sealing Systems, Bretten GmbH & Co., Bretten (DE)

( * ) Notice: Subject to any disclaimer, the term of this patent is extended or adjusted under 35 U.S.C. 154(b) by 0 days.

(21) Appl. No.: 10/781,140

(22) Filed: Feb. 18, 2004

(65) Prior Publication Data
US 2004/0195776 A1    Oct. 7, 2004

(30) Foreign Application Priority Data
Feb. 18, 2003    (DE)    ................................ 103 06 602

(51) Int. Cl.
*F02F 11/00* (2006.01)
*F16J 15/32* (2006.01)
(52) U.S. Cl. ................. 123/195 C; 277/566; 277/574
(58) Field of Classification Search ............ 123/195 C; 277/566, 573, 574
See application file for complete search history.

(56) References Cited

U.S. PATENT DOCUMENTS
4,480,609 A * 11/1984 Hayashi .................. 123/195 C

FOREIGN PATENT DOCUMENTS
EP    0 727 575 B1    1/1999

* cited by examiner

*Primary Examiner*—Andrew M. Dolinar
(74) *Attorney, Agent, or Firm*—Dickinson Wright PLLC

(57) ABSTRACT

A sealing system for a shaft, in particular for a combustion engine, with a motor casing cover having a clearance hole for take-up of a carrier is shown having at least one dynamically and at least one statically effective sealing area and is equipped with a centering area that allows centering relative to the clearance hole, when the carrier is securely connected to the motor casing cover by means of a quarter-turn fastener. The centering area is arranged on the level of the quarter-turn fastener in such a way that the dynamic sealing area is aligned with a shaft and the static sealing area with given pressure can be used in a corresponding section of the motor casing cover.

8 Claims, 2 Drawing Sheets

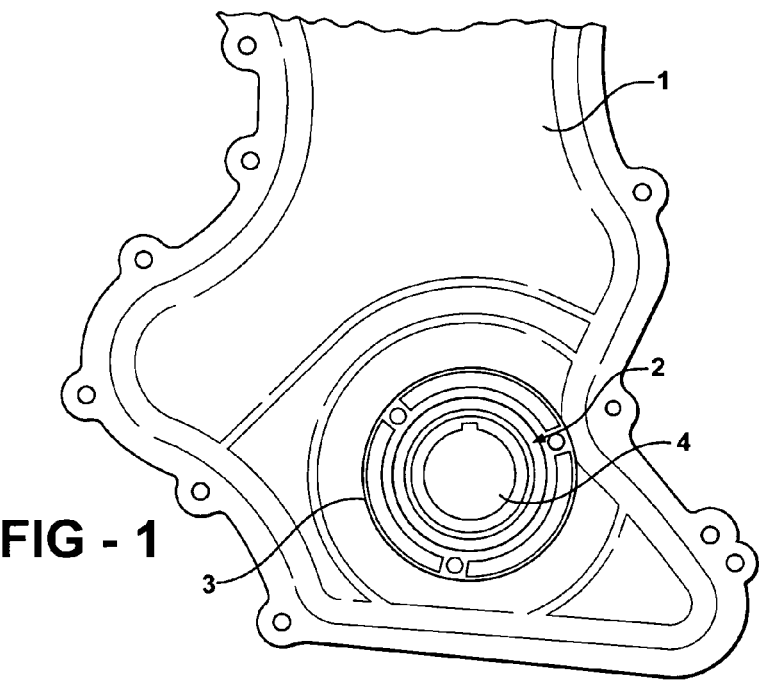
FIG - 1
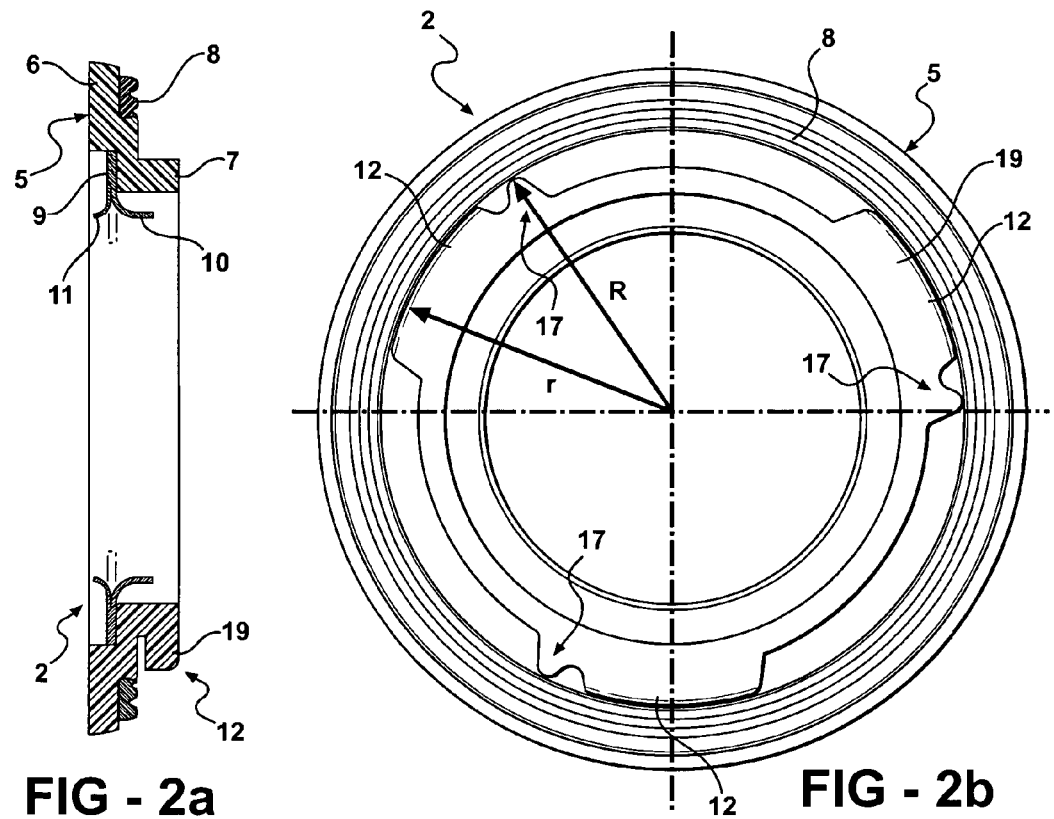
FIG - 2a   FIG - 2b

SEALING SYSTEM FOR A SHAFT

This application claims priority to German Application Serial No. 103 06 602.0 filed Feb. 18, 2003.

1. Technical Field

The invention refers to a sealing system for a shaft, in particular for a combustion engine, with a motor casing cover containing a clearance hole for take-up of a carrier which shows both at least one dynamically and at least one statically effective sealing area and equipped with a centering area allows centering relative to the clearance hole, while the carrier is securely connectable to the motor casing cover by means of a quarter-turn fastener.

2. Related Art

The shaft sealing can be seen in EP-B 0 727 575. The device consists of a motor cover plate with a circular concave sink in which the outer circumferential part of the shaft sealing can be pressed and centered. An outer subrange of the seal can be centered and by means of an inner quarter-turn fastener locked in position with regard to an axially reversed leg of the sink. The disadvantage of this prior art is that the cover plate must contain a relatively precise sink to enable most favorable (centric) application of the dynamically effective sealing area to the corresponding motor shaft. The manufacturing expense is considered extensive and costly.

SUMMARY OF THE INVENTION

The invention is based on the objective of offering an alternative sealing system which, without external centering, provides at least as good a centering effect as does the state-of-the-art technology. Manufacturing expenses within the take-up section of the sealing system should be reduced compared to the prior art. This objective can be met by arranging the centering section on the level of the quarter-turn fastener in such a way that the dynamic sealing area aligned with the shaft and the static sealing area with a given contact pressure can be attached at a corresponding part of the motor casing cover.

Differing from the prior art, the sink for centering take-up of the outer circumferential surface of the shaft seal is no longer necessary, rendering the working step for its manufacturing dispensable. The sealing system according to the invention is applied effectively directly to the area of the quarter-turn fastener in a centering manner together with corresponding areas of the motor casing cover.

The carrier cross-section is essentially L-shaped, thus forming radial and axial legs. Similar to the prior art, the locking effect between the take-up element and sealing system is achieved by means of a quarter-turn fastener. The quarter-turn fastener extending partially at several peripheral locations is designed for the area of the axial leg. Seen in cross section, neighboring quarter-turn fasteners extend the lugs according to the invention, while at least three lugs are arranged evenly along the circumference.

To support the centering of the carrier, the diameter of the lugs is greater than the diameter of the quarter-turn fasteners. Through this measure it is possible to ensure an easy introduction of the sealing systems into the appropriate take-up area of the motor casing cover and, because of the progressive rotation of the sealing system relative to the motor casing cover, it is also possible to ensure an effective centering connection between the carrier and the motor casing cover. At the same time an appropriate secure connection between the sealing system and the motor casing cover is achieved. This measure secures centering of the dynamic sealing area of the rotating component, in particular in the area of the quarter-turn fastener, as an alternative to the state-of-the-art technology.

Advantageously, the carrier is made from plastic, while the static and/or dynamic sealing area(s) are bonded to it, in particular due to the spraying effect.

The subject matter of the invention is illustrated by way of example as follows:

FIG. 1 shows a cutout of a motor casing cover;

FIGS. 2a and 2b show elevational and cross-sectional views, respectively, of the sealing system according to the invention;

DETAILED DESCRIPTION

Figure 3:
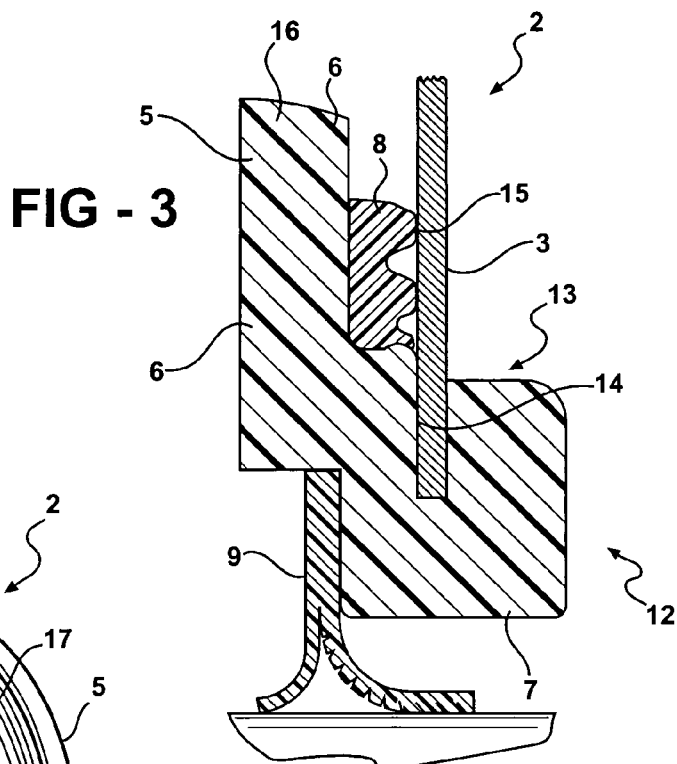
FIG. 3 shows a detail of the sealing system subrange.

FIG. 1 shows an elementary diagram of motor casing cover 1 intended for take-up of sealing system or assembly 2. The motor casing cover 1 is designed in straight running, non-profile sections 3, which can be brought into effective connection with the sealing system 2. Sealing system 2 is inserted in a centering manner into the clearance hole 4.

FIGS. 2a and 2b shows the sealing system 2 according to the invention in different views or rather sections. The carrier 5, which should be made from plastic in this case, is visible. The cross-section of the carrier 5 is L-shaped and includes a radial leg 6 and axial leg 7. In the outer circumferential area of radial leg 6, a statically effective sealing area 8 is formed. Dynamic sealing area 9 includes a main lip 10 and a secondary lip 11, both attached to axial leg 7. With the help of the centering area 12 the sealing system 2 is positioned in the clearance hole of the motor casing cover 1. Merely indicated here is the quarter-turn fastener 19 which will be described in detail, particularly in FIG. 4.

FIG. 3 shows a detail view of a partial section of the sealing system 2 according to FIG. 2. Visible are the carrier 5, the static sealing area, and the dynamic sealing area. 9. Furthermore, the radial leg 6 and axial leg 7 can also be seen. Within the transition range 13 of radial leg 6 to axial leg 7 are incisions 14 arranged in cross sections, in which at least partial ranges of the straight section 3 (merely indicated) of the motor casing cover 1 gear rest. The lips 15 of the static sealing area 8 lie flat in an appropriate sealing manner under given pressure against this straight running range of section 3, while the outer area 16 of the radial leg 6 does not have any contact with the motor casing cover 1. The centering area 12 is also shown.

Figure 4:
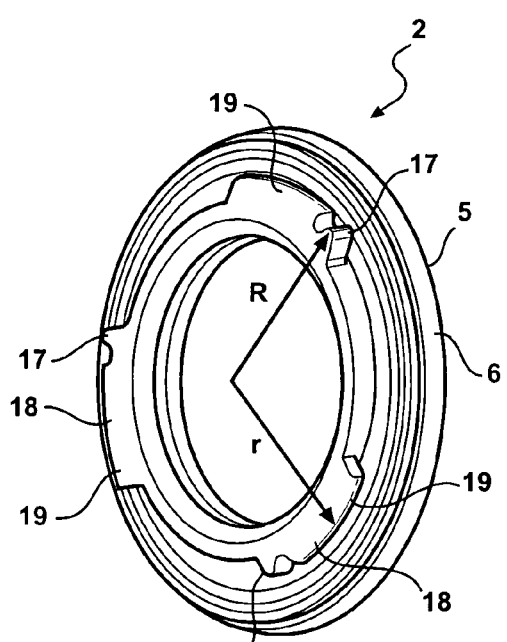
FIG. 4 shows the carrier in perspective.

FIG. 4 shows the sealing system 2 according to the invention in perspective view. Visible is the carrier 5 containing radial leg 6 and axial leg 7. The quarter-turn fastener 19, as already indicated in FIG. 2, extends to defined peripheral locations 18. Seen in cross section, each neighboring quarter-turn fastener 19 extends the lugs 17 according to the invention. The outer range of the lugs 17 extends along radius R which is greater than radius r, along which the outer range of the quarter-turn fastener 19 extends. Upon installation of the sealing system 2 in the clearance hole 4 of the motor casing cover 1 (FIG. 5), the lugs 17 take over the centering while the quarter-turn fastener 19 provides locking effect between sealing system 2 and motor casing cover 1.

Figure 5:
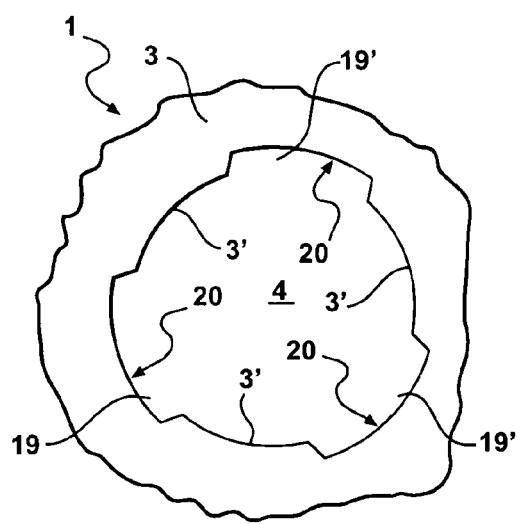
FIG. 5 shows an enlarged view of the clearance hole according to FIG. 1.

FIG. 5 shows the clearance hole 4 of the motor casing cover 1 in detail. The clearance hole 4 within the straight running range 3 of the motor casing cover is designed in such a way that it creates clearances 19' corresponding to quarter-turn fastener 19. The quarter-turn fastener 19 is inserted in these clearances 19'. The outer diameter or radius R along which the lugs 17 are extended is selected so that the lugs 17 contact the outer circumferential surface 20 of the clearances 19' to obtain the centering, while the outer diameter or radius r along which the quarter-turn fasteners are extended is modestly smaller.

Upon rotation of the sealing system 2 within the clearance hole 4, the quarter-turn fasteners 19 reach the range 3' of the motor casing cover 1, thus providing the locking effect. During rotation, the lugs 17 are permanently supported by the outer circumferential surfaces 20.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. The sealing system for a shaft of a combustion engine having a motor easing cover (1) with a clearance hole (4) for receipt of a carrier (5) having at least one dynamically (9) and at least one statically effective sealing area (8) and the carrier (5) being equipped with a centering area (12) allowing centering relative to the clearance hole (4), while the carrier (5) is securely connectable to the motor casing cover (1) by means of partial-turn fastener tabs (19) disposed on the carrier (5), the centering section (12) is arranged generally co-planer with the partial-turn fastener tabs (19) in such a way that the dynamic sealing area (9), aligned with the shaft and the static sealing area (8), with a given contact pressure can be used in a corresponding area (3) of the motor casing cover (1), and wherein the centering area (12) is formed by radially arranged lugs (17), and as seen in cross section, the lugs (17) are arranged next to the partial-turn fastener tabs (19).

2. The sealing system according to claim 1 wherein the static sealing area (8) is applicable to a straight running section (3) of the motor casing cover (1).

3. The sealing system according to claim 1 wherein the carrier (5) has a cross-section that is essentially L-shaped, thus forming one radial (6) and one axial (7) leg, and that a lug (17) is arranged in the area of the axial leg (7) while, distributed on the perimeter of the carrier, more lugs (17) are provided.

4. The sealing system according to claim 1 wherein the outer area of the lugs (17) extends along radius R which is greater than radius r, along which the outer area of the partial-turn fastener (19) extends.

5. The sealing system according to claim 1 wherein the carrier (5) is made from plastic, on which the static (8) and/or the dynamic sealing area (9) is formed.

6. The sealing system according to claim 3 wherein the radial leg (6) of the carrier (5) supports the statically effective sealing area (8).

7. The sealing system according to claim 6 wherein the axial leg (8) of the carrier (5) acts in combination with the dynamically effective sealing area (9).

8. A sealing system, comprising:

a case having an opening with an inner edge disposed about a central axis of said opening and a plurality of circumferentially spaced clearances extending radially outward from said inner edge separated by land regions between said clearances;

a shaft extending through said opening;

a seal assembly mounted on the case including a carrier mounting a dynamic seal encircling said shaft to provide dynamic sealing between said carrier and said shaft, and mounting a static seal engaging said case to provide a static sealing between said carrier and said case;

a partial-turn fastener feature disposed on said carrier, said partial-turn fastener feature including a plurality of fastener tabs and a corresponding plurality of centering lugs extending radially outwardly and disposed about a central axis of said seal assembly, said lugs being receivable in said clearances while said respective fastener tabs engage the edge of said clearance and rotate to a position behind said land regions to lock said carrier in position on said case and to align said axis of said seal assembly concentrically with said axis of said opening, said lugs being disposed adjacent one each of said fastener tabs.

* * * * *